United States Patent [19]

Maddock

[11] 4,305,224

[45] Dec. 15, 1981

[54] APPARATUS FOR SELECTIVE APPLICATION OF HERBICIDE

[76] Inventor: Mitchell E. Maddock, Rte. 1, Box 24AA, Florence, Ariz. 85232

[21] Appl. No.: 72,147

[22] Filed: Sep. 4, 1979

[51] Int. Cl.³ .................... A01M 21/00; A01N 5/00
[52] U.S. Cl. .................... 47/1.5; 401/140; 401/196; 401/204; 401/205
[58] Field of Search ............ 47/1.5; 401/138, 137, 401/140, 196, 203, 204, 205, 206, 207, 146

[56] References Cited

U.S. PATENT DOCUMENTS

| | | | |
|---|---|---|---|
| 1,744,254 | 1/1930 | Zaiden | 401/207 X |
| 2,082,582 | 6/1937 | Kling | 401/207 |
| 2,223,809 | 12/1940 | Rucker | 47/1.5 |
| 2,316,326 | 4/1943 | Garin | 401/203 |
| 3,021,642 | 2/1962 | Ewing | 47/1.5 |
| 3,077,701 | 2/1963 | Osmun | 47/1.5 |
| 3,080,590 | 3/1963 | Mullinix et al. | 401/146 X |
| 3,103,690 | 9/1963 | Day | 401/206 X |
| 3,161,905 | 12/1964 | Dryden | 401/204 |
| 3,184,888 | 5/1965 | Froth et al. | 47/1.5 |
| 4,019,278 | 4/1977 | McKirdy | 47/1.5 |
| 4,027,986 | 6/1977 | Patrick | 47/1.5 |
| 4,187,638 | 2/1980 | Hardy et al. | 47/1.5 |

FOREIGN PATENT DOCUMENTS

| | | | |
|---|---|---|---|
| 554858 | 2/1957 | Belgium | 401/203 |
| 69744 | 11/1958 | France | 401/207 |
| 259625 | 7/1949 | Switzerland | 401/203 |
| 22294 | of 1899 | United Kingdom | 401/205 |

Primary Examiner—Steven A. Bratlie
Attorney, Agent, or Firm—Herbert E. Haynes, Jr.

[57] ABSTRACT

An apparatus for selective application of liquid herbicide includes a tubular handle which serves as a reservoir for containing the herbicide and for supplying the herbicide to an integral applicator head. The reservoir handle has a valve for controlling the herbicide dispensing flow rate of the applicator head which includes at least one elongated wicking element by which the herbicide is wipingly applied on undesired vegetation.

6 Claims, 10 Drawing Figures

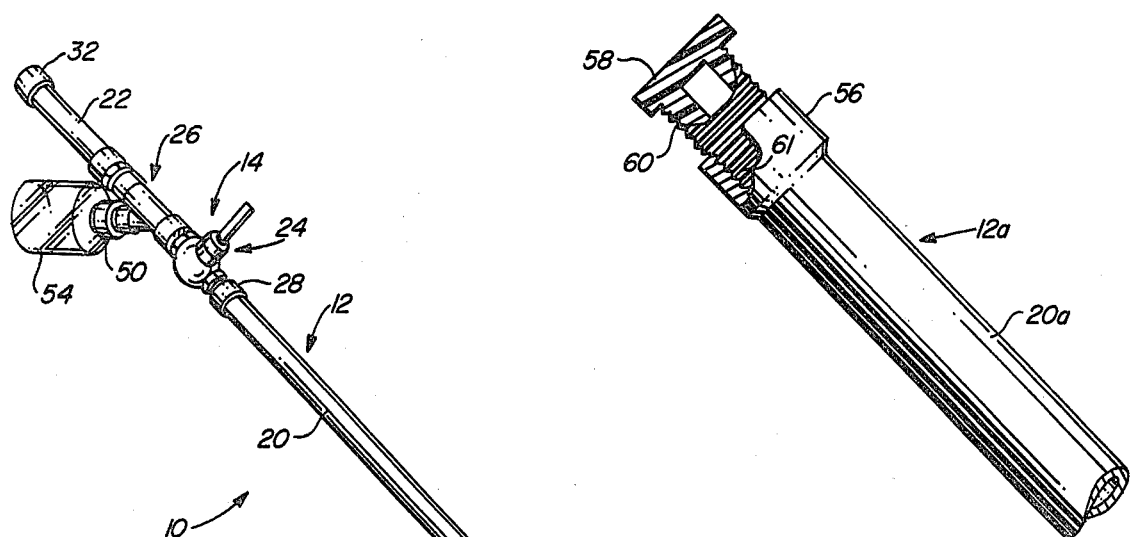
FIG-3
FIG-1
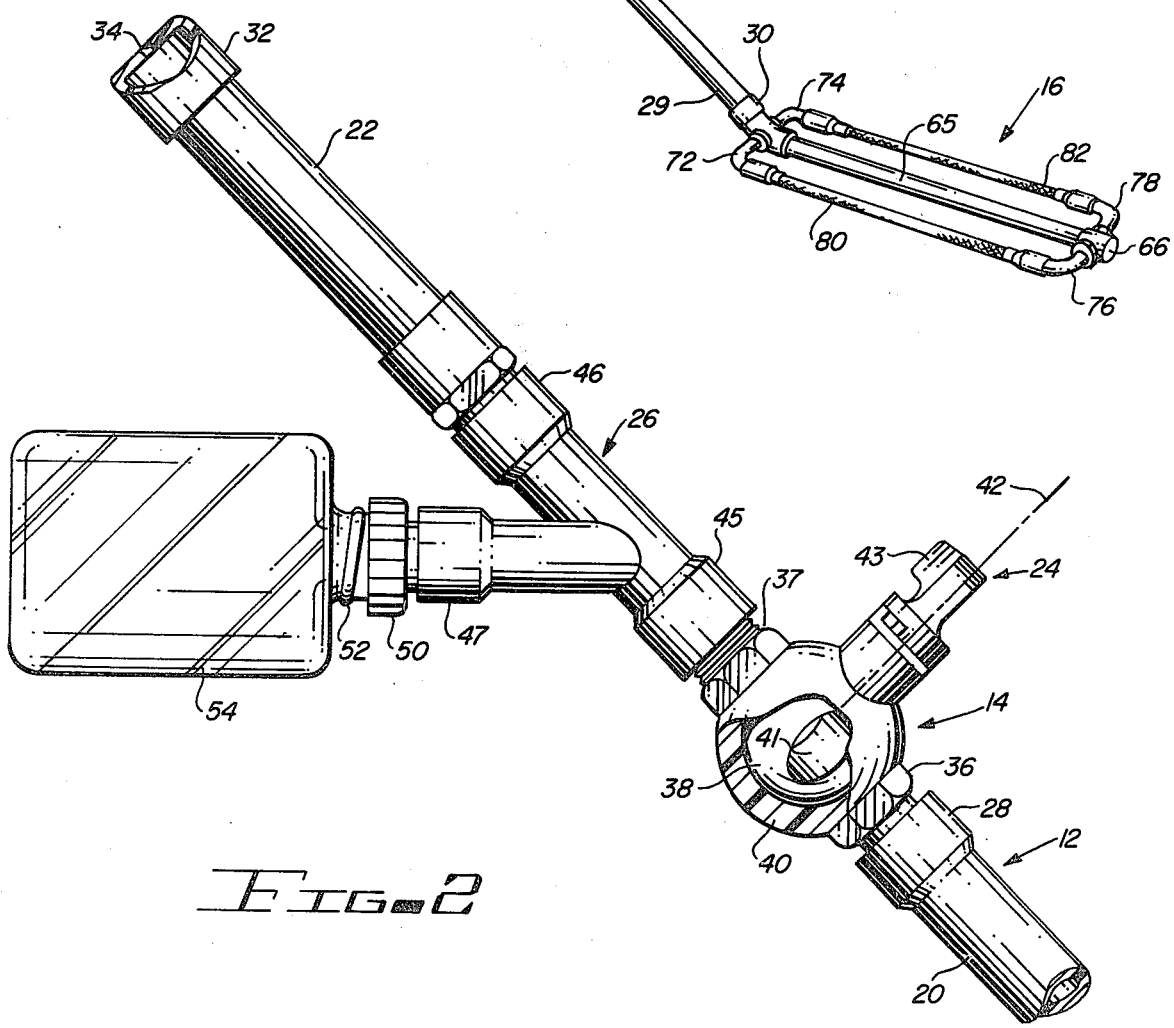
FIG-2

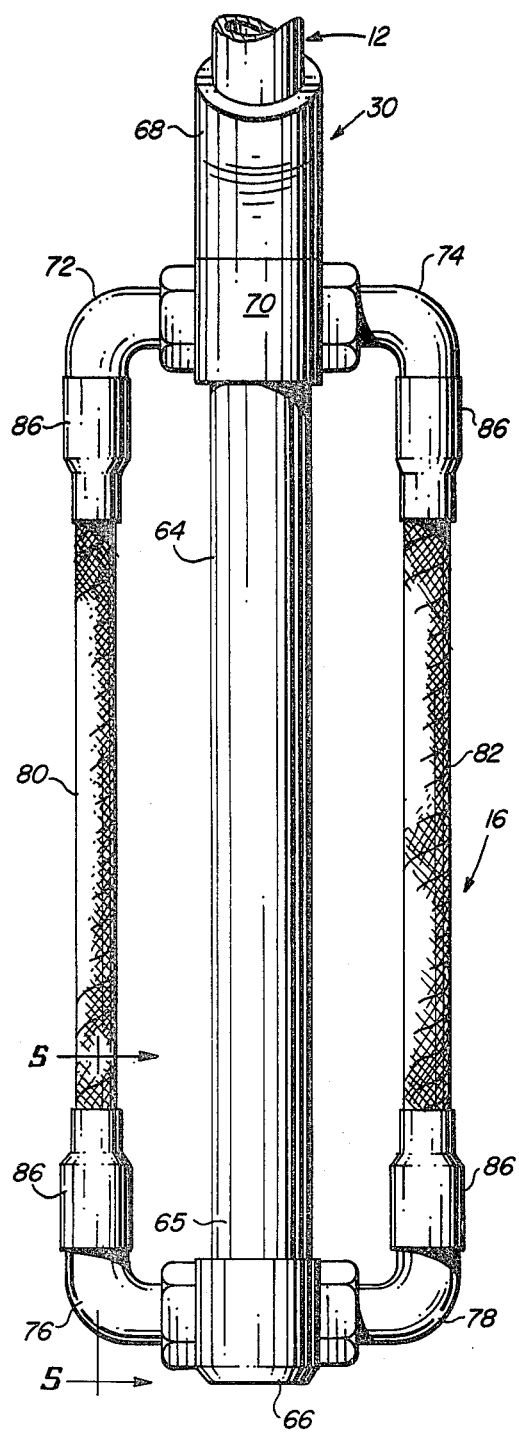
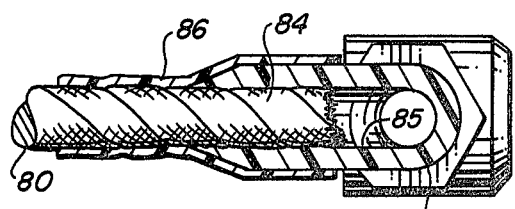
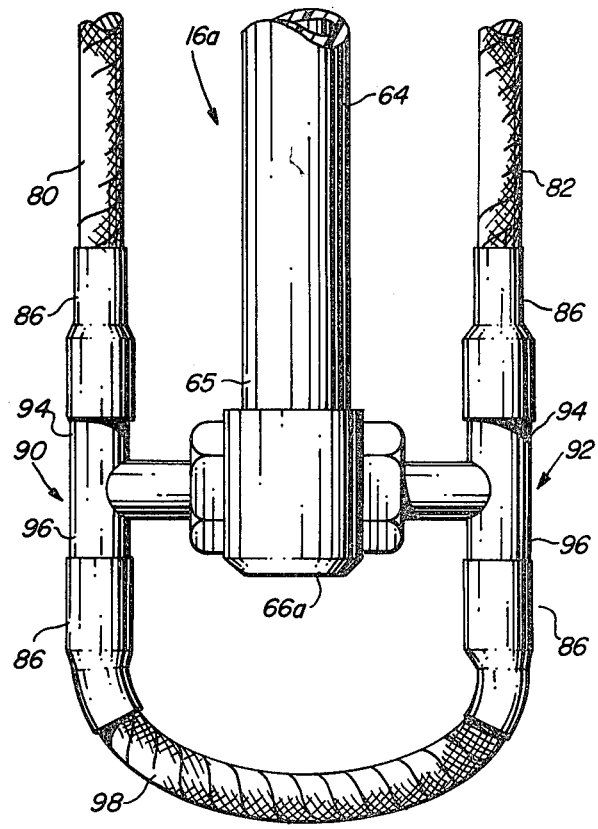

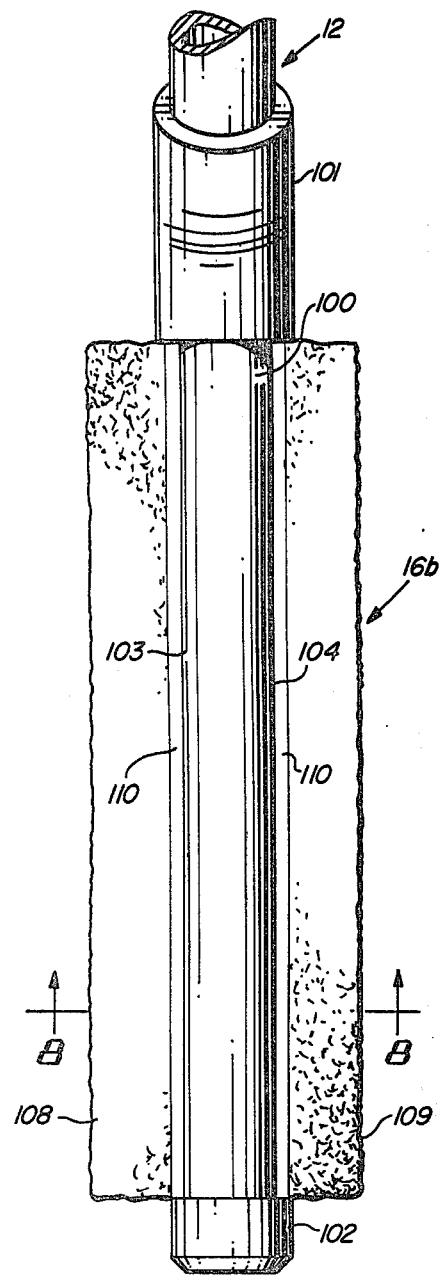
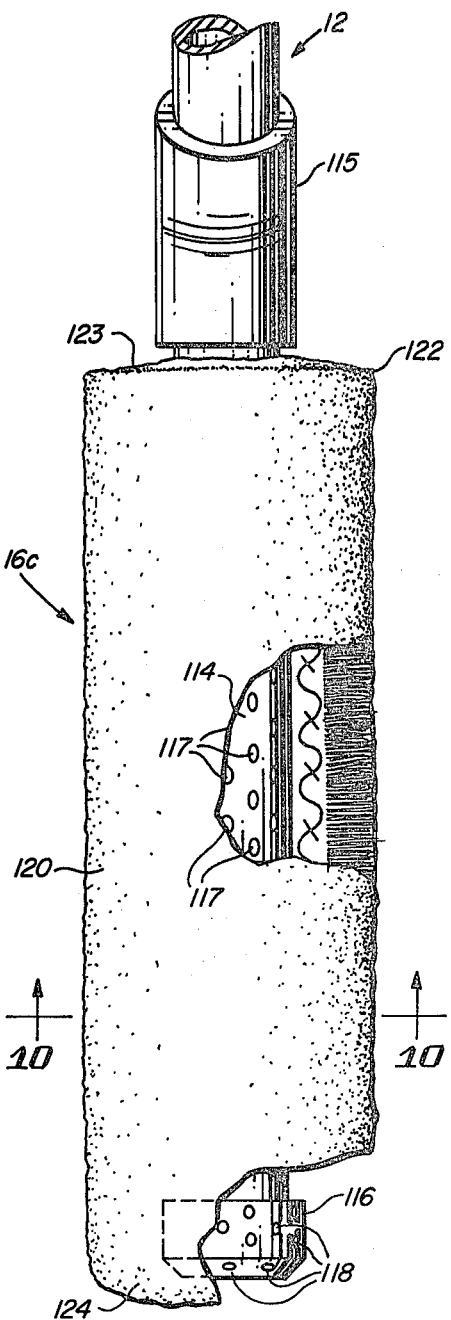
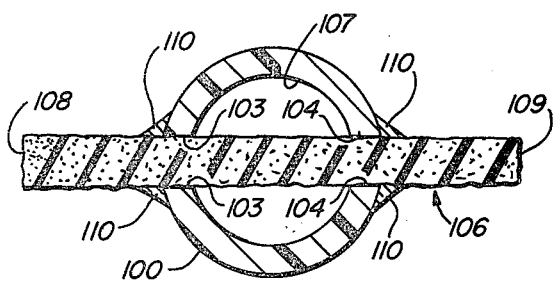
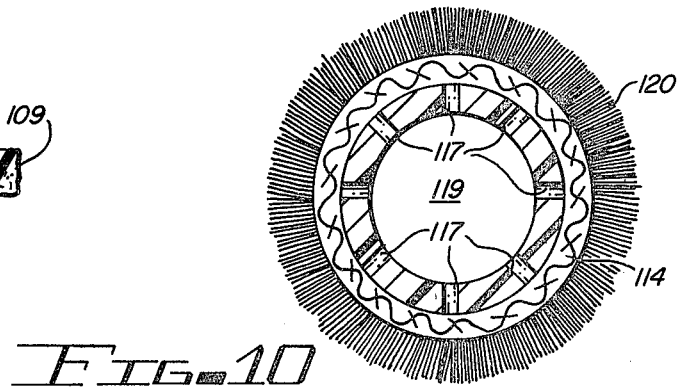

APPARATUS FOR SELECTIVE APPLICATION OF HERBICIDE

BACKGROUND OF THE INVENTION

1. Field of the Invention

This invention relates to the application of herbicides and more particularly to an apparatus for selective application of herbicides.

2. Description of the Prior Art

A new type of liquid herbicide has recently been developed which is sometimes referred to as a systemic herbicide. A systemic herbicide is one which will be absorbed by the vegetation to which it is applied and will permeate the vegetation to kill the root systems without affecting the soil in any way. Systemic herbicide and other types of herbicides may be applied by a conventional spray method when complete destruction of all plant life in a sprayed area is desired. However, selective herbicidal tasks such as weeding operations, require that herbicides be selectively applied only to the vegetation which is to be destroyed, and this, of course, eliminates the usage of spraying application techniques.

A special herbicide applicator which is designed primarily for use with systemic herbicide has been developed for use in cultivated fields and this device is in the form of a trailing wick that is attached to a tractor, or other farming mechanism. The special trailing wick applicator is carried by the farm machine so as to follow the furrows between the crop plants. In this manner, the trailing wick applicator will wipe the herbicide on the weeds that are growing in the furrows only in that the trailing wick cannot be allowed to come into close proximity with the crop plants. Thus, such a device is limited in its use in that it cannot be employed to kill vegetation that is proximate any plants that are not to be killed, due to the fact that the trailing wick applicator cannot be controlled with any desired degree of accuracy.

A hand held herbicide applicator has been developed for selective application purposes, and that applicator is fully disclosed in U.S. Pat. No. 4,027,986. Briefly, this particular prior art applicator comprises a reservoir handle with a fill and vent control plug on its upper end and an applicator head on its other end. The applicator head is a bell-shaped enlargement which is filled with a foam rubber material and has its lower open end wrapped with a carpeting material. The herbicide flows from the reservoir handle through an orifice and saturates the foam rubber and the carpeting material. Although this applicator can be used for selectively applying herbicide on vegetation, its usage is limited to a more or less dabbing type of application due to the particular head configuration. The applicator head is designed primarily for dabbingly applying the herbicide on newly cut tree trunks to kill the root systems thereof and cannot practically and efficiently be used to wipingly apply herbicide to, for example, weeds which have outgrown slower growing grasses and the like, and it is awkward to use in between closely spaced crop plants.

Therefore, a need exists for a new and improved hand held apparatus for selective application of liquid herbicides, with the apparatus overcoming some of the shortcomings of the prior art.

SUMMARY OF THE INVENTION

In accordance with the present invention, a new and improved apparatus for selective application of systemic herbicide and other types of herbicides is disclosed. The apparatus comprises an elongated tubular handle which serves as a reservoir for the liquid herbicide and an integral especially configured applicator head at the lower end of the handle by which the herbicide is wipingly applyable to vegetation that is to be destroyed. In a first embodiment, the apparatus of the present invention includes a herbicide flow control means in the form of a vent control plug which is located at the uppermost end of the reservoir handle. When the vent control plug is threadingly removed from the reservoir handle, the open upper end of the handle serves as a fill port, and the vent control plug is employed for controlling the feed rate of the applicator head in that varying amounts of threaded insertion of the vent plug adjustably varies the amount of air that is allowed to enter the handle and fill the partial vacuum created when the herbicide is dispensed by the applicator head. In a second embodiment, the reservoir handle is fixedly vented at its uppermost end and the herbicide flow control means includes a herbicide supply container demountably attached thereto at a point between the vented upper end and a flow and vent control shut-off valve that is mounted in the handle. By manipulating the flow and vent control valve between the open and closed positions thereof, a user can control the flow of herbicide from the supply container into the reservoir handle, and thus into the applicator head, and can control the feed rate of the applicator head by adjustably varying the amount of air that is allowed to enter the handle.

In either of the above described reservoir handle configurations, the applicator head includes an elongated tubular dispenser member which has one of its ends integral with the lower end of the reservoir handle, and in communication with the bore thereof to receive the liquid herbicide, and its other end is free and is sealingly closed. In a first embodiment of the applicator head, a pair of elongated wicking elements are located on opposite sides of the tubular dispenser member so as to be parallel with respect to each other and in close proximity to the dispenser member and to lie in a horizontal plane. Each of the pair of elongated wicking elements has its opposite ends in communication with the bore of the tubular dispenser member so that the herbicide will saturate the wicking elements by a wicking action. In addition to the pair of elongated wicking elements, an arcuately curved wicking element may be provided which lies in the same horizontal plane, and is looped around the closed free end of the dispenser member with its opposite ends also being in communication with the bore of the dispenser member. In a second and preferred embodiment of the applicator head, the tubular dispenser member has elongated slots formed through each of its diametrically opposed sides and an elongated planar wicking element is fixedly inserted in the tubular dispenser member so as to pass through the bore thereof with its opposite longitudinal edges extending from the slots so as to be located adjacent the diametrically opposed sides thereof, the liquid herbicide in the bore of the tubular dispenser member is absorbed by the planar wicking element and wicking action will cause wetting of the extending opposite longitudinal edges thereof. In a third embodiment of the applicator head, the tubular dispenser member is a perforated structure with a plurality of apertures formed through its peripheral surface. An elongated cylindrical wicking element is fixedly coaxially mounted on the perforated tubular dispenser member for wickingly absorbing the herbicide which exits the bore of the dispensing member through the apertures thereof.

In use, the apparatus is simply swung in a back and forth motion so that the applicator head moves in a horizontal plane while the user is walking. Such use will bring the saturated elongated wicking elements of the above described applicator head embodiments into contact with, for example, weeds that have outgrown slower growing vegetation that the user desires to keep, and will wipingly apply the herbicide to the weeds. The arcuately curved wicking element of the first embodiment of the applicator head which is located at the closed free end of the dispensing member is used as a probe for wipingly applying the herbicide on, for example, undesired vegetation that is growing between closely spaced crops, in corners, and in other closely confined areas.

Accordingly, one object of the present invention is to provide a new and improved apparatus for selectively applying herbicide on undesired vegetation.

Another object of the present invention is to provide a new and improved apparatus for selective application of a systemic herbicide on undesired vegetation.

Another object of the present invention is to provide a new and improved apparatus for selective application of herbicide on undesired vegetation with the apparatus including a tubular reserboir handle for containing the herbicide and supplying it to an applicator head which is especially designed for wiping application of the herbicide.

Another object of the present invention is to provide a new and useful apparatus of the above described character which includes a herbicide flow control means for controlling the herbicide dispensing flow rate of the applicator head.

Another object of the present invention is to provide a new and useful apparatus of the above described character in which the herbicide flow control means includes a threaded vent plug located at the uppermost end of the tubular reservoir handle for adjustably varying the amount of air that is allowed to enter the reservoir handle.

Another object of the present invention is to provide a new and improved apparatus of the above described character in which the herbicide flow control means includes a herbicide supply container which is demountably attached to the reservoir handle and has a flow and vent control shutoff valve by which the flow of the herbicide into the reservoir handle and the applicator head is controlled, and by which the dispensing flow rate of the applicator head is controlled by varying the amount of air that is allowed to enter the apparatus.

Another object of the present invention is to provide an apparatus of the above described character in which the special applicator head includes a pair of elongated wicking elements that are located on opposite sides of an elongated tubular dispensing member so as to lie in a horizontal plane with the wicking elements coupled to the dispensing member for wickingly extracting the herbicide from the dispensing member.

Another object of the present invention is to provide an apparatus of the above described character in which the special applicator head further includes an arcuately curved wicking element which is looped around the free end of the tubular dispensing member so as to lie in the same horizontal plane as the elongated wicking elements, and is coupled to the dispensing member for wickingly extracting the herbicide from the dispensing member.

Still another object of the present invention is to provide an apparatus of the above described character in which the special applicator head includes an elongated planar wicking element that is positioned in the bore of an elongated tubular dispensing member so as to lie in a horizontal plane with the opposite longitudinal edges of the wicking element extending from diametrically opposed sides of the tubular dispensing member.

Yet another object of the present invention is to provide an apparatus of the above described character in which the special applicator head includes an elongated cylindrical wicking element coaxially mounted on the periphery of an elongated perforated tubular herbicide dispensing member.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view of one embodiment of the apparatus for selective application of herbicide of the present invention and illustrating the various features thereof.

FIG. 2 is a fragmentary elevational view of the reservoir handle portion of the apparatus of the present invention with this view being partially broken away to illustrate the various features of a first embodiment thereof.

FIG. 3 is a fragmentary elevational view similar to FIG. 2 and showing a second embodiment of the reservoir handle portion of the apparatus of the present invention.

FIG. 4 is a top plan view of a first embodiment of the special applicator head portion of the apparatus of the present invention.

FIG. 5 is an enlarged fragmentary sectional view taken along the line 5—5 of FIG. 4.

FIG. 6 is a fragmentary top plan view similar to FIG. 4 and showing a modification of the applicator head shown in FIG. 4.

FIG. 7 is a top plan view of a second embodiment of the special applicator head portion of the apparatus of the present invention.

FIG. 8 is an enlarged sectional view taken along the line 8—8 of FIG. 7.

FIG. 9 is a top plan view of a third embodiment of the special applicator head portion of the apparatus of the present invention.

FIG. 10 is an enlarged sectional view taken along the line 10—10 of FIG. 9.

DESCRIPTION OF THE PREFERRED EMBODIMENTS

Referring more particularly to the drawings, FIG. 1 illustrates the apparatus for selective application of liquid herbicides, with this apparatus of the present invention being indicated in its entirety by the reference numeral 10.

In the preferred embodiment shown in FIG. 1, the apparatus includes, as will hereafter be described in detail, a reservoir handle 12 for containing a liquid herbicide (not shown), a herbicide flow control means 14 for controlling delivery of the herbicide to the apparatus, and adjustably controlling the dispensing flow rate thereof, and a special applicator head 16 by which the herbicide is selectively wipingly applied to vegetation that is to be destroyed.

As seen in FIGS. 1 and 2, the reservoir handle 12 includes an elongated tubular conduit 20 which forms the lower portion of the reservoir handle 12, and a considerably shorter tubular conduit 22 which forms the upper portion thereof, with a shutoff valve means 24 and a fitting 26 which forms part of the herbicide flow control means 14, interposed therebetween. The elongated tubular conduit 20 which serves as a reservoir for the liquid herbicide has its upper end 28 coupled to the shutoff valve 24 and its lower end 29 coupled to an elbow 30 which interconnects the reservoir handle 12 to the applicator head 16. The upper tubular conduit 22, which serves as a handle grip for a user and as a venting standpipe through which air is admitted to the reservoir handle 12, has its lower end coupled to the fitting 26 and has its upper end closed with a cap 32 in which a venting orifice 34 is provided.

The herbicide flow control means 14, as mentioned above, includes the shutoff valve 24 which is an in-line valve having an opposed pair of ports 36 and 37. The shutoff valve 24 may be any of several types of manually operated valves such as the ball valve shown best in FIG 2. As is known, the ball shutoff valve 24 is provided with a ball 38 which is rotatably seated in a spherical cavity formed in the valve housing 40, and the ball 38 is provided with a passage 41 which extends therethrough. Rotation of the ball 38 about an axis 42 is manually accomplished by a handle 43 which is suitably connected to the ball. Manual operation of the handle 43 will rotatably move the ball 38 between a full open position wherein the axis of the passage 41 is aligned with the longitudinal axis of the reservoir handle 12, and a fully closed position wherein the axis of the passage 41 is transverse to the axis of the reservoir handle.

The port 36 of the ball shutoff valve 24 is connected to the upper end 28 of the elongated tubular conduit 20 as hereinbefore mentioned, and the port 37 thereof is connected to a port or branch 45 which is one of three ports or branches 45, 46 and 47 of the fitting 26 which is in the form of a Y-bend fitting. The branch 46 of the Y-bend fitting is connected to the lower end of the tubular conduit 22 and the third branch 47 of the Y-bend fitting 26 has an internally threaded container cap 50 suitably mounted thereon. The cap 50 is adapted to threadingly receive the neck 52 of a herbicide supply container 54 in a manner which places the interior of the container in communication with the interior of the Y-bend fitting 26 and thus, in communication with the bore of the reservoir handle 12. With the herbicide supply container 54 connected to the reservoir handle 12 in the above described manner, the herbicide (not shown) is directed into the handle 12 by opening the ball shutoff valve 24 and tipping up the apparatus 10 so that the herbicide will flow from the container 54 through the fitting 26 and the ball valve 24 into the bore of the elongated tubular member 20. The amount of herbicide initially supplied to the reservoir handle, and the amount supplied during use of the apparatus 10, is, of course, controllable by manipulation of the handle 43 of the ball shutoff valve. When usage of the apparatus 10 is complete, the herbicide may be removed from the apparatus 10 by simply tipping it in the reverse direction, with the ball shutoff valve open so that the herbicide will drain back into the supply container 54.

It should be noted that since the herbicide supply container 54 is demountably connected to the reservoir handle 12, the container should be removed from the apparatus 10 during nonuse thereof and closed for storage purposes. Further, the container may be refillable for reusage purposes, or it can be a throw-away item that is replaced when the herbicide is exhausted.

As will become apparent as this description progresses, the herbicide supply to the reservoir handle 12 will be dispensed from the applicator head 16, and such dispensing will create a partial vacuum in the elongated tubular handle 20 when the ball shutoff valve 24 is closed. Such a partial vacuum will eventually stop, or at least considerably slow down, the flow rate of the herbicide dispensed from the applicator head 16. Thus, manual opening of the ball shutoff valve 24 at various times during usage of the apparatus 10 will relieve the partial vacuum by allowing air to enter into the reservoir handle 12 through the vent orifice 34 provided in the upper end of the handle 12. The herbicide flow control means 14 by virtue of its ability to control the amount of herbicide supplied to the reservoir handle and to control the partial vacuum formed therein during usage, allows the user to control the herbicide dispensing flow rate of the applicator head 16.

Reference is now made to FIG. 3 wherein a second embodiment of the apparatus of the present invention is shown. In this embodiment, the reservoir handle 12a includes a single elongated tubular conduit 20a having an internally threaded upper end 56 in which a vent plug 58 is demountably threadably received. When the vent plug 58 is completely removed from the upper end 56 of the conduit 20a, the upper end 56 serves as a fill port through which the herbicide (not shown) is supplied to and drained from the apparatus. The vent plug 58 is provided with pipe threads 60 which, as is known are tapered, and similar internal pipe threads 61 are formed in the upper end 56 of the conduit 20a. When the vent plug 58 is threaded all the way into the upper end 56 of the conduit, the fit between the threads is tight and as the plug 58 is backed out of the upper end 56 the threaded fit therebetween will become looser, and this is used to relieve the partial vacuum in the reservoir handle 12 and thereby provide the desired control of the herbicide dispensing flow rate of the apparatus.

Referring now to FIGS. 4 and 5 wherein the especially configured applicator head 16 is best seen. The applicator head 16 includes an elongated tubular herbicide dispenser member or conduit 64 one end of which is coupled to the elbow 30 which, as hereinbefore mentioned is employed to interconnect the reservoir handle 12 and the applicator head 16. The other free end 65 of the dispenser conduit 64 is closed with a cap 66.

The elbow 30 is of special configuration and has the usual conduit receptacle portion 68 and has the other receptacle portion 70 thereof drilled or otherwise formed to receive a pair of 90° elbows 72 and 74 on diametrically opposed sides thereof, with the elbows 72 and 74 being in communication with the bore of the elbow 30. Likewise, the cap 66 is of special configuration in that it is drilled or otherwise formed to receive a pair of 90° elbows 76 and 78 on diametrically opposed sides with those elbows 76, 78 being in communication with the bore of the cap. The special elbow 30 and special cap 66 are oriented so that the elbow 72 mounted on the elbow 30 is aligned with the elbow 76 mounted on the cap 66, and the elbow 74 mounted on the elbow 30 is aligned with the elbow 78 mounted on the cap 66, and all of the elbows 72, 74, 76 and 78 lie in the same plane which is held in a substantially horizontal position during use of the apparatus 10 as will hereinafter be described in detail.

The applicator head 16 further includes a pair of elongated wicking elements 80 and 82 with the wicking element 80 extending between and connected to the aligned elbows 72 and 76, and the wicking element 82 extending between and connected to the aligned elbows 74 and 78. A typical connection of the wicking elements 80 and 82 to their respective elbows 72, 74, 76 and 78 is shown in FIG. 5 wherein one end 84 of the wicking element 80 is shown as being inserted into the bore 85 of the elbow 76. It is essential that the wicking elements be connected to their respective elbows in a drip-proof manner to prevent dripping of the herbicide from those connection points which could result in destruction of vegetation that the user did not wish to destroy. Further, it is essential that the opposite ends of the wicking elements be fixedly secured to their respective elbows to prevent decoupling in the event that the wicking elements strike a solid object during usage of the apparatus. Such drip-proof fixed interconnection of the opposite ends of the wicking elements in the elbows may be accomplished in any suitable fashion such as by applying a suitable adhesive such as epoxy (not shown) to the ends of the wicking elements 80 and 82 prior to insertion thereof into the elbows 72, 74, 76 and 78, and employing a shrink tube collar 86 at each of the connection points. As is well known, shrink tubing is a plastic material which shrinks upon the application of heat. Thus, the adhesive will fixedly attach the wicking elements 80 and 82 to their respective elbows 72, 74, 76 and 78, and the shrink tube collars will prevent dripping of the herbicide at those connection points.

Another method of providing fixed drip-proof connections, without requiring the use of adhesive, is to employ a special type of multi-ply shrink tubing which is known as surface irradiated polyolefin tubing. When this special tubing is heated for shrinking purposes, the inner ply will melt and upon cooling will be firmly bonded to the wicking elements and to the elbows. This special tubing is identified as Surface Irradiated Polyolefin No. FIT 300, and is available from the Alpha Wire Corporation of 711 Lidgerwood Ave., Elizabeth, N.J. —07207.

To use the apparatus 10 configured as described above, the liquid herbicide (not shown) is supplied to the reservoir handle 12 in either of the manners hereinbefore described, and the herbicide will flow unimpeded into the distributor conduit 64 of the applicator head 16. The herbicide in the distributor conduit 64 will fill the elbows 72, 74, 76 and 78, and will thus be in contact with the opposite ends of the wicking elements 80 and 82. The wicking elements will absorb the herbicide so that they will, by virtue of wicking action, become saturated along their entire lengths. Then, a user, by holding the apparatus 10 so that the wicking elements lie in a substantially horizontal plane, and moving the apparatus 10 with a swinging back and forth motion while he walks, will wipingly apply the herbicide on the vegetation that he desires to destroy.

Referring now to FIG. 6 wherein a modified form of applicator head is shown, with this modified head being indicated generally by the reference numeral 16a. In the modified applicator head 16a the special cap 66a which closes the free end 65 of the herbicide dispenser conduit 64, is drilled or otherwise formed to receive tees 90 and 92 in the diametrically opposed sides thereof in a manner which places the internal passages of the tees in communication with the bore of the cap. The elongated wicking elements 80 and 82, are in the manner hereinbefore described, fixedly attached in a drip-proof manner to the branches 94 of their respectively aligned tees 90 and 92. The oppositely extending branches 96 of the tees 90 and 92 receive the opposite ends of an arcuate wicking element 98 which is disposed so that it loops around the cap 66a and lies in the same plane as the elongated wicking elements 80 and 82. The opposite ends of the arcuate wicking element 98 are fixedly attached in a drip-proof manner, as previously described, to the branches 96 of their respective tees 90 and 92.

The arcuate wicking element 98 is saturated with the herbicide (not shown) in the same manner as the elongated wicking elements 80 and 82 and is useful in a probing manner to wipingly apply the herbicide in confined places such as between closely spaced crops, in corners and the like.

Referring now to FIGS. 7 and 8 wherein another embodiment of the special applicator head is shown, with this second embodiment being indicated in its entirety by the reference numeral 16b. The applicator head 16b includes a tubular herbicide dispenser conduit 100, one end of which is coupled to the reservoir handle 12 by a conventional elbow 101 and the other free end of the conduit 100 is closed by a conventional closure cap 102. The dispenser conduit 100 is provided with a longitudinally extending pair of slots 103 and 104 which are aligningly formed through diametrically opposed sides and extend substantially the full length of the conduit. An elongated planar wicking element 106, preferrably of rectangular configuration, is attached to the conduit 100 so that the central portion of the wicking element 106 is in the bore 107 of the conduit and the opposite longitudinal edges 108 and 109 extend through the slots 103 and 104 respectively and are thus located adjacent the diametrically opposed sides of the conduit and lie in a substantially horizontal plane when the apparatus of the present invention is in use as hereinbefore described. The planar wicking element 106 is fixedly attached to the tubular conduit 100 in any suitable manner which forms a drip-proof connection such as by being clampingly held in place by the slots 103 and 104, or by being cemented in place by a suitable adhesive as shown at 110 in FIG. 8. The planar wicking element 106 may be formed of any suitable wicking material, such as a synthetic sponge material so that when the bore 107 of the conduit 100 contains the liquid herbicide (not shown), it will be absorbed by the central portion of the element 106 and will be wickingly conducted to the longitudinal edges 108 and 109 for wiping application on undesired vegetation.

A third embodiment of the special applicator head is shown in FIGS. 9 and 10 and is indicated generally by the reference numeral 16c. The applicator head 16c includes a tubular herbicide dispenser conduit 114 one end of which is coupled to the reservoir handle 12 by a conventional elbow 115 with the other free end of the conduit being closed by a special closure cap 116. The dispenser conduit 114 is perforated by virtue of its having a plurality of apertures 117 formed therein, and the closure cap 116 is also perforated by virtue of its having a plurality of apertures 118 formed therethrough. The apertures 117 of the conduit 114 and the apertures 118 of the cap 116 are formed so that the bore 119 of the tubular conduit 114 is in communication with the peripheral surfaces of the conduit and the cap. An elongated cylindrical wicking element 120 is coaxially mounted on the tubular conduit 114 so that when the bore 119 of the conduit has the liquid herbicide therein, the wicking element will wickingly absorb the herbicide that exits the bore 119 through the apertures 117 and 118. The elongated cylindrical wicking element 120 has an open end 122 so that it may be slidingly assembled on the tubular conduit 114 whereupon, that open end 122 is sealingly coated with a suitable adhesive 123 which prevents dipping of the herbicide on that end and fixedly attaches the wicking element on the tubular conduit. The opposite end 124 of the cylindrical wicking element 120 is closed by the wicking material itself so that it encloses the perforated cap 116. It will be understood that the cylindrical wicking element can be open at both of its opposite ends (not shown) in which case, a nonperforated conventional closure cap (not shown) is employed on the free end of the conduit 114 and both ends of the wicking element are fixedly sealingly enclosed in the above described manner. The cylindrical wicking element 120 may be formed of any suitable wicking material such as carpeting which is sewn or otherwise formed into the desired configuration, or a well known generally available paint roller structure may be used.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An apparatus for selective manual application of a liquid herbicide to undesired vegetation growing at ground level, said apparatus comprising:
    (a) a tubular reservoir handle for containing the liquid herbicide, said reservoir handle being elongated for manual holding at a downwardly and forwardly extending angle which defines an application position;
    (b) an elongated applicator head integrally extending from the end of said reservoir handle which is downwardly disposed when said reservoir handle is in the application position, said applicator head extending angularly from said reservoir handle so as to lie in a substantially horizontal plane when said reservoir handle is in the application position, said applicator head including,
        I. an elongated tubular herbicide dispenser conduit the bore of which is in communication with the bore of said reservoir handle for receiving the herbicide therefrom,
        II. means for closing the free end of said dispenser conduit,
        III. a pair of elongated rope-like wicking elements each mounted on a different diametrically opposed side of said dispenser conduit so as to be spaced coextensive parallel relationship therewith,
        IV. means on said dispenser conduit and fixedly attached to the opposite ends of each of said pair of wicking elements for placing those opposite ends in communication with the bore of said dispenser conduit and are coupled thereto in a drip-proof manner,
        V. an arcuate wicking element disposed in a looped around position with respect to the closed free end of said dispenser conduit and lying in the same plane as said pair of elongated wicking elements,
        VI. means for fixedly coupling the opposite ends of said arcuate wicking element to diametrically opposed sides of said dispenser conduit so that those opposite ends are in communication with the bore of said dispenser conduit and are coupled thereto in a drip-proof manner; and
    (c) said pair of elongated wicking elements and said arcuate wicking element for saturatingly absorbing the herbicide from the bore of said dispenser conduit for wiping application thereof on selected vegetation when said reservoir handle is held in the application position and moved so as to swing said applicator head back and forth in a substantially horizontal plane.

2. An apparatus as claimed in claim 1 and further comprising an herbicide flow control means mounted in the opposite end of said reservoir handle for controlling the herbicide dispensing flow rate of said applicator head by controlling the amount of air that is allowed to enter said reservoir handle to relieve the partial vacuum created therein when the herbicide is dispensed by said applicator head.

3. An apparatus as claimed in claim 1 and further comprising:
    (a) said reservoir handle having a fill port in the opposite end thereof with said fill port having internal pipe threads formed therein; and
    (b) a vent plug having external pipe threads formed thereon so that when said vent plug is tightly threadingly inserted into said fill port no air will be allowed to enter into said reservoir handle and when said vent plug is loosely threadingly inserted into said fill port air will enter said reservoir handle, with this control of the air flow being usable to selectively relieve the partial vacuum created in said reservoir handle when the herbicide is being dispensed by said applicator head and thereby control the herbicide dispensing flow rate of said applicator head.

4. An apparatus as claimed in claim 1 and further comprising:
    (a) said reservoir handle having an air vent formed in the opposite end thereof;
    (b) a manually operable shutoff valve means in said reservoir handle;
    (c) a herbicide supply container demountably coupled to said reservoir handle at a point between the vented opposite end thereof and said shutoff valve means, said supply container for delivering liquid herbicide to said reservoir handle; and
    (d) said shutoff valve means movable from a closed position where the herbicide from said supply container and the air from the vented opposite end of said reservoir handle are kept from entering into said reservoir handle and an open position where the herbicide and air are allowed to enter said reservoir handle.

5. An apparatus as claimed in claim 1 and further comprising:
  (a) said reservoir handle including,
    I. an elongated tubular conduit one end of which is the end from which said applicator head extends,
    II. a shorter tubular conduit spaced from said elongated tubular conduit and having a vented end;
  (b) a shutoff valve means having two ports one of which is connected to the other end of said elongated tubular conduit;
  (c) a Y-bend fitting having a first branch connected to the other port of said shutoff valve means, a second branch connected to the other end of said shorter tubular conduit and having a third branch;
  (d) a container cap connected to the third branch of said Y-bend fitting;
  (e) a herbicide supply container demountably connected to said container cap; and
  (f) said shutoff valve means movable between a closed and an open position for adjustably controlling the flow of air from the vented end of said shorter tubular conduit and the herbicide from said supply container into said elongated tubular conduit.

6. An apparatus for selective manual application of a liquid herbicide to undesired vegetation growing at ground level, said apparatus comprising:
  (a) a tubular handle for containing the liquid herbicide and being elongated for manual holding at a downwardly and forwardly extending angle which defines an application position, said tubular handle including,
    I. an elongated tubular conduit having an upwardly disposed and a downwardly disposed end,
    II. a shorter tubular conduit axially spaced from the upwardly disposed end of said elongated tubular conduit and having a upwardly disposed vented end;
  (b) a shutoff valve means having two ports one of which is coupled to the upwardly disposed end of said elongated tubular conduit;
  (c) a Y-bend fitting having a first branch connected to the other port of said shutoff valve means, a second branch connected to the other end of said shorter tubular conduit and having a third branch;
  (d) a container cap connected to the third branch of said Y-bend fitting;
  (e) a herbicide supply container demountably connected to said container cap;
  (f) said shutoff valve means being movable between a closed position and an open position for controlling the flow of air from the vented end of said shorter tubular conduit and the herbicide from said supply container into said elongated tubular conduit; and
  (g) an applicator head extending angularly from the downwardly disposed end of said elongated tubular conduit so as to lie in a substantially horizontal plane when said tubular handle is held in the application position, said applicator head including,
    I. an elongated tubular herbicide dispenser conduit the bore of which is in communication with the bore of said tubular handle for receiving the herbicide therefrom,
    II. means for closing the free end of said dispenser conduit,
    III. a pair of elongated rope-like wicking elements each mounted on a different diametrically opposed side of said dispenser conduit and each spaced in coextending parallel relationship therewith,
    IV. fitting means mounted on said dispenser conduit for placing said rope-like wicking elements in communication with the bore of said dispenser conduit, said fitting means fixedly attached to the opposite ends of said pair of rope-like wicking elements so that those opposite ends are in communication with the bore of said dispenser conduit,
    V. an arcuate rope-like wicking element disposed in spaced looped around position with respect to the closed free end of said dispenser conduit, the opposite ends of said arcuate rope-like wicking element being fixedly connected to said fitting means to place those ends in communication with the bore of said dispenser conduit.

* * * * *